No. 788,667. PATENTED MAY 2, 1905.
M. W. McCANN.
WHEELED HAND RAKE.
APPLICATION FILED FEB. 20, 1905.
2 SHEETS—SHEET 1.
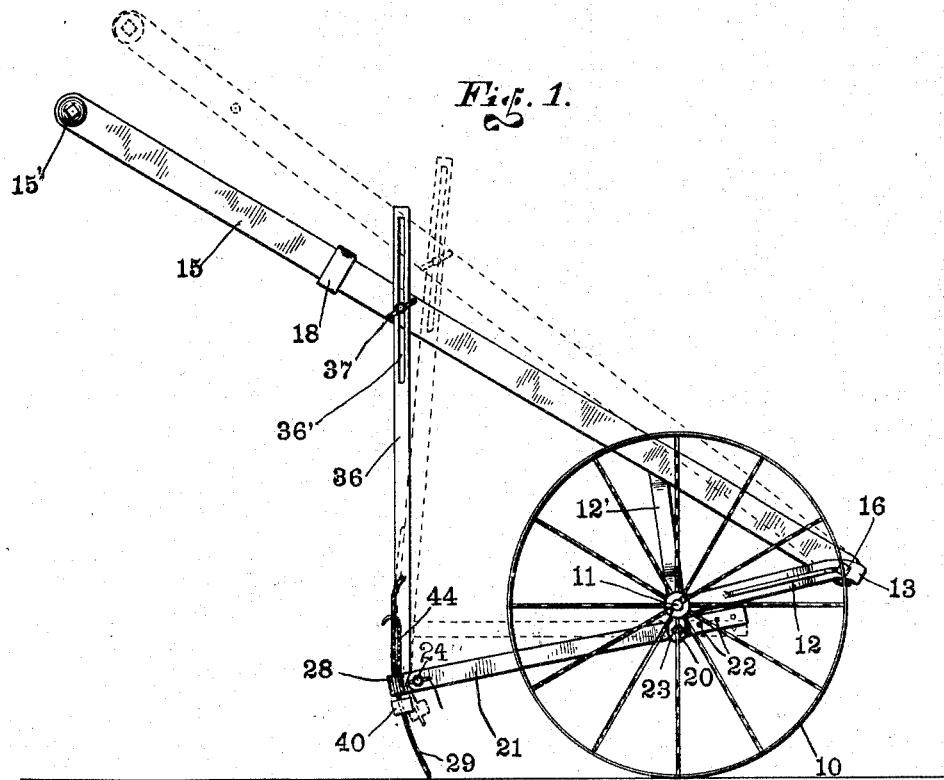
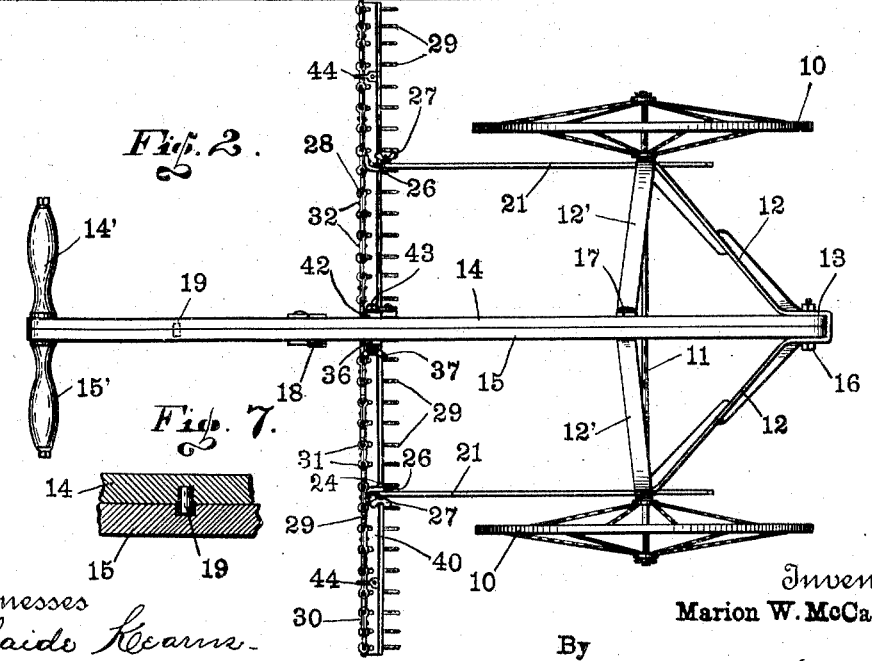
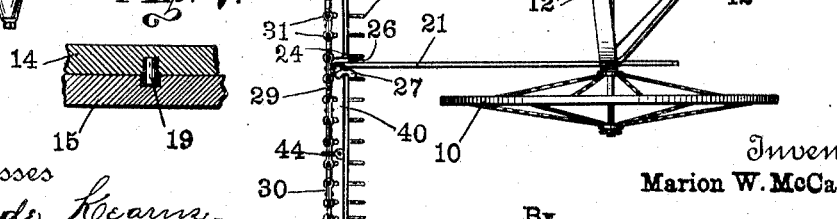
Witnesses
Adelaide Kearns
J. A. Walsh
Inventor
Marion W. McCann
By
Bradford & Hood
Attorneys.

No. 788,667. PATENTED MAY 2, 1905.
M. W. McCANN.
WHEELED HAND RAKE.
APPLICATION FILED FEB. 20, 1905.
2 SHEETS—SHEET 2.
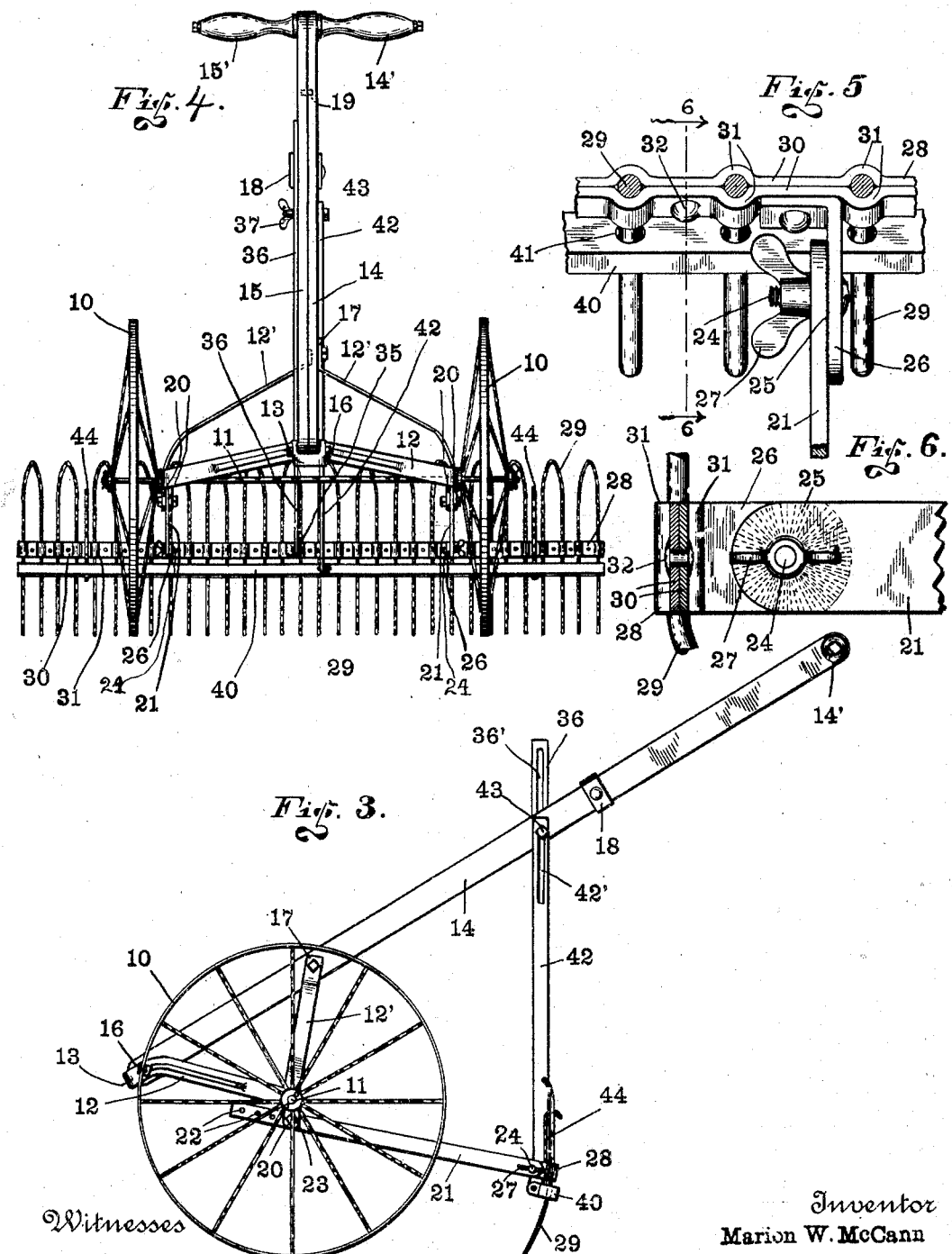
Witnesses
Adelaide Kearne
J. A. Walsh
Inventor
Marion W. McCann
By
Bradford Hood
Attorneys No. 788,667.                                                                                          Patented May 2, 1905.

UNITED STATES PATENT OFFICE.

MARION W. McCANN, OF RUSHVILLE, INDIANA, ASSIGNOR TO McCANN-COOK-CASE CO., OF RUSHVILLE, INDIANA, A COPARTNERSHIP.

WHEELED HAND-RAKE.

SPECIFICATION forming part of Letters Patent No. 788,667, dated May 2, 1905.

Application filed February 20, 1905. Serial No. 246,523.

*To all whom it may concern:*

Be it known that I, MARION W. McCANN, a citizen of the United States, residing at Rushville, in the county of Rush and State of Indiana, have invented certain new and useful Improvements in Wheeled Hand-Rakes, of which the following is a specification.

The object of my invention is to produce a wheeled hand-rake which may be used either as a garden-rake or lawn-rake.

The accompanying drawings illustrate my invention.

Figure 1 is a side elevation; Fig. 2, a plan; Fig. 3, an elevation of the side opposite to that shown in Fig. 1; Fig. 4, a front elevation; Fig. 5, an enlarged detail plan of the reversible attachment for the rake-head; Fig. 6, a section on line 6 6 of Fig. 5, and Fig. 7 a sectional detail.

In the drawings, 10 10 indicate a pair of carrying-wheels connected by an axle 11. The axle 11 is supported in a suitable frame 12. This frame has a pair of forwardly-converging members which at their forward ends form a vertical space or socket 13, within which are placed the lower forward ends of a pair of handle members 14 and 15. The lower ends of these two members are supported upon a horizontal bolt 16, and the member 14 is rigidly attached at 17 to upwardly and rearwardly converging arms 12', which form part of the frame 12. The handle member 15 is free to swing on the bolt 16 and when in operating position is held immediately adjacent the member 14 by means of a U-shaped clip 18, which is attached to the member 14, and also by means of a dowel-pin 19, which projects from the member 14 into the member 15, as clearly shown in Fig. 7. The handle member 14 is provided at its upper rear end with a handpiece 14', and the member 15 is provided with a similar handpiece 15'.

Projecting downwardly from the frame 12 at each side is a pair of ears 20, between each pair of which is projected the forward end of a link 21, the forward end of each of these links being provided with a plurality of perforations 22, through any one of which may be passed a bolt 23, said bolt also passing through a pair of ears 20 in order to pivotally connect each link with the frame 12. Each link is perforated at its rear end in order to receive a bolt 24, and one face of the rear end of each link is preferably roughened, as indicated at 25, in order to coact with a similarly-roughened face of a finger 26, through which the bolt 24 is also passed. Bolt 24 is provided with a butterfly-nut 27, by means of which the parts may be clamped together in any desired position of angular adjustment.

The fingers 26 are attached to and project forward from the rake-head 28, and this rake-head carries a plurality of rake-teeth 29, which are preferably double-ended, one end serving as a lawn-rake, while the other ends are for garden-rake purposes, this being a common and usual construction. In the production of this rake I prefer to use a pair of flat metal strips 30 30, which are provided with transverse depressions or corrugations 31, thus forming when placed together transverse grooves through which the wires of the rake-teeth 29 may pass and in which the said wires may be clamped by suitable rivets 32, which secure the plates 30 30 together. Secured to the plates 30 30 is a finger 35, to which is pivotally connected the lower end of a link 36, having a slot 36'. If desired, a stripper member 40 may be strung upon the garden-rake teeth, this stripper member consisting, preferably, as usual, of a strip of wood having perforations 41 slightly larger than the rake-teeth. Secured to the stripper member 40 is an upwardly-extending link 42, which at its upper end has a sliding engagement through slot 42' with a bolt or pin 43, carried by the stationary handle member 14. Secured to the stripper 40, one near each end, are two hooks 44, which extend up some distance above the rake-head 28 and have their hooked ends extended over plates 30.

In operation the two handle members 14 and 15 are normally held together by the clip 18 and the dowel-pin 19, and the height of the portions 14' and 15' is adjusted to suit the operator by loosening the bolt 37 and swinging the frame 12 on the axle 11 until the desired height is reached and then clamping the parts. The distance of the rake-head from the frame may be adjusted by inserting the bolts 23 in the proper holes 22, and the angle of the rake-head to the ground may be adjusted by swinging the fingers 26 upon the bolts 24. Either the garden side or the lawn side of the rake-head may be brought into service by detaching the bolts 24 and reversing the head, the stripper 40 and link 42 being removed when the lawn side of the rake-head is turned down. When a desired accumulation of material has been produced by the rake, a windrow may be formed by springing the free end of the handle member 15 outwardly sufficiently to withdraw it from the dowel-pin 19 and then swinging this handle member upwardly, as indicated in dotted lines in Fig. 1, about the bolt 16.

I claim as my invention—

1. A wheeled rake consisting of a wheeled supporting-frame having an upwardly and rearwardly inclined handle member, a similar handle member laid alongside the first handle member and pivotally attached at its lower end to the supporting-frame, a pair of rearwardly-extending links pivotally attached to the wheeled structure, a rake-head attached to said links, and a link connecting the said rake-head to the pivoted handle member.

2. A wheeled rake consisting of, a wheeled supporting-frame having an upwardly and rearwardly inclined handle member, a similar handle member laid alongside the first handle member and pivotally attached at its lower end to the supporting-frame, a pair of rearwardly-extending links pivotally attached to the wheeled structure, a rake-head attached to said links, a link connecting the said rake-head to the pivoted handle member, and means for adjusting the length of said last-mentioned link.

3. A wheeled hand-rake consisting of a wheeled structure, a pair of rearwardly-extending links pivotally attached thereto, and a reversible rake-head detachably attached to said links, whereby either side of the rake-head may be brought into action.

4. A wheeled hand-rake consisting of a wheeled structure, a double-sided rake-head, and a detachable reversible connection between said wheeled structure and said rake-head whereby either side of the rake-head may be brought into action.

5. A wheeled hand-rake consisting of a wheeled structure, a double-sided rake-head, a pair of links connected each at one end to said wheeled structure, a pair of fingers carried by the rake-head and arranged to coöperate with the free ends of the links, and a pair of bolts connecting said links and fingers and permitting detachment and angular adjustment of the rake-head.

In witness whereof I have hereunto set my hand and seal, at Indianapolis, Indiana, this 17th day of February, A. D. 1905.

MARION W. McCANN. [L. S.]

Witnesses:
JASPER W. CASE,
FRED G. ZOOK.